2,880,213

6α-ALKYL-4,16-PREGNADIENE-3,20-DIONES

Bjarte Löken, Roosevelt, and Hector Flores, San Juan, Puerto Rico, assignors to G. D. Searle & Co., Chicago, Ill., a corporation of Delaware No Drawing. Application May 27, 1958
Serial No. 738,008

2 Claims. (Cl. 260—397.3)

The present invention relates to a new group of 6α-alkyl steroids and, more specifically, to the 6α-alkyl-4,16-pregnadiene-3,20-diones of the structural formula

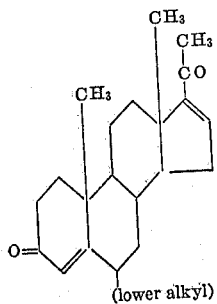

(lower alkyl)

In the foregoing structural formula the lower alkyl group in the 6-position is preferably a methyl or ethyl group.

These compounds are valuable intermediates in the synthesis of highly potent progestational agents. Specifically, these compounds can be converted to 6α-alkyl-17α-acyloxy-4-pregnene-3,20-dione derivatives which, as shown in a separate application by Bjarte Löken, are highly potent progestational agents. A typical conversion of the 6α-alkyl-4,16-pregnadien-3,20-diones to the 6α-alkyl-17α-acyloxy-4-pregnene-3,20-diones is shown in one of the examples hereinbelow.

The compounds claimed herein are conveniently prepared by treating with alkali the corresponding 6α-alkyl-16β-(δ-acetoxy-γ-methylpentanoyloxy)-4-pregnene-3,20-diones, which, in turn, are prepared from diosgenin by a procedure which is also the subject matter of a separate, copending application.

The compounds which constitute this invention and the procedure for making these will appear more fully from the examples which are given for purposes of illustration only, and are not to be construed as limiting the invention in spirit or in scope. Quantities are indicated as parts by weight.

Example 1

A solution of 100 parts of diosgenin in 1340 parts of dichloromethane is treated under ice cooling with a solution containing 160 parts acetone, 270 parts of dichloromethane, 2 parts of sodium acetate, and 70 parts of commercial peroxyacetic acid. The mixture is then maintained at room temperature for 5 hours and at the end of that time washed with 1000 parts of a 5% ferrous sulfate solution to reduce the excess peroxyacetic acid. The organic layer is separated and washed with water, and the washings are reextracted with dichloromethane. The organic extracts are combined and concentrated to dryness on a steam bath, and then 800 parts of heptane are added, and a small head fraction is distilled off in order to remove residual dichloromethane. The mixture is cooled to 30° C. under agitation, and the crystalline material is collected on a filter. This crystalline material consists predominantly of 5α,6α-epoxy-22-isoallospirostan-3β-ol. The mother liquor is evaporated to a small volume, and a second crop is harvested, which is also a mixture of 2 epimeric epoxides containing mainly the β-epoxide. The first crop is dissolved in dichloromethane and then treated with 1300 parts of heptane, and the mixture is distilled to remove the dichloromethane. Upon complete removal of the dichloromethane, almost pure 5α,6α-epoxy-22-isoallospirostan-3β-ol is obtained, melting at about 225–227° C. A solution of 150 parts of this epoxide in 2700 parts of toluene is slowly added to 1500 parts of a 3-molar commercial solution of methylmagnesium bromide. The mixture is then refluxed for 150 minutes, chilled, and treated with water until no more reaction can be observed. It is then subjected to steam distillation, and the residual suspension is cooled and treated with a mixture of 480 parts of concentrated hydrochloric acid and 400 parts of water. The crude product is collected on a filter, washed and dried. It is then dissolved with dichloromethane, treated with activated charcoal, and filtered through a filter aid. The clear filtrate is concentrated to a small volume and methanol is added. The mixture is then distilled until all dichloromethane has been removed and until crystallization begins. Upon cooling, the product crystallizes and, on recrystallization from methanol, there is obtained 6β-methyl-22-isoallospirostane-3β,5α-diol which melts at about 226.5–230° C. The rotation in chloroform $\alpha_D$ is −85°.

Substitution of an equimolar equivalent of ethylmagnesium bromide for the methylmagnesium bromide in the foregoing reaction yields the 6β-ethyl-22-isoallospirostane-3β,5α-diol.

Example 2

To an agitated suspension of 55.5 parts of 6β-methyl-22-isoallospirostane-3β,5α-diol in 880 parts of acetone, which is cooled to 15° C., is added in small portions in the course of 45 minutes a solution of 14.8 parts of chromium trioxide in 27 parts of water containing 5 parts of sulfuric acid, the temperature being allowed to rise to 25° C. Agitation is then continued for 90 minutes, after which 2300 parts of ice water are added and the resulting precipitate is collected on a filter, washed with much water, and then with a 1% aqueous sodium bicarbonate solution, and finally, again with water. The 5α-hydroxy-6β-methyl-22-isoallospirostan-3-one thus prepared is sufficiently pure for use in the procedure of the next two examples. On recrystallization from equal parts of dichloromethane and acetone, a melting point of 244.5–246° C. is obtained. The rotation $\alpha_D$ in chloroform is −75°.

Example 3

A suspension of 43 parts of 5α-hydroxy-6β-methyl-22-isoallospirostan-3-one in 98 parts of acetic anhydride is heated in a sealed tube at 195° C. for 6 hours, after which the contents are cooled, and 40 parts of pyridine are added. The solution is precipitated in a large volume of ice water under agitation, and the resulting mixture is agitated for 3 hours. The aqueous phase is then removed, and the oily residue is repeatedly extracted with water. The residue consists predominantly of 6-methyl-3,26-diacetoxy-3,5,20(22)-furostatriene.

To the crude 6-methyl-3,26-diacetoxy-3,5,20(22)-furostatriene thus obtained is added a solution of 20 parts of potassium hydroxide in 30 parts of water and 150 parts of methanol. This mixture is heated for 45 minutes under reflux with efficient agitation. The resulting 6α-methyl-26-hydroxy-4,20(22)-furostadien-3-one is precipitated by pouring the reaction product resulting from the saponification into 1000 parts of ice water with agitation. The mixture is then permitted to settle and the aqueous phase is decanted. The oily residue is washed repeatedly with water at 50° C. Prior to each decantation it is found advisable to cool the mixture by the addition of ice. The final residue, which has an almost solid consistency, is spread on a ceramic dish for air drying. The dried material is then transferred into a reaction vessel, the ceramic dish is extracted with 45 parts of pyridine, and the extracts are added to the reaction vessel. Finally 44 parts of acetic anhydride are added, and the mixture is maintained at 60° C. for 45 minutes. The 6α-methyl-26-acetoxy-4,20(22)-furostadien-3-one thus obtained is precipitated by addition to 1000 parts of ice water. After settling, the aqueous phase is decanted, and the residue is once more washed with water.

The residue is then transferred with 240 parts of dichloromethane into a reaction vessel to which are added 190 parts of glacial acetic acid. Ten parts of water are added to remove any residue of acetic anhydride. The solution thus obtained is cooled to 5° C. and treated by slow addition with a solution of 18 parts of chromium trioxide in 25 parts of water and 20 parts of acetic acid while the mixture is efficiently stirred. In the course of the addition, which takes about 45 minutes, the temperature is permitted to rise to about 12° C. Agitation is continued for 3 hours at a temperature of about 20 to 25° C. after which water is added. Further addition of a saturated solution of sodium chloride permits a convenient separation. The aqueous layer is separated and reextracted with dichloromethane, and the combined organic extracts, which are usually green but occasionally bluish-violet in color, are taken to dryness on a steambath. Water is twice added to the residue and distilled off in vacuum to remove residual solvents.

To the 6α-methyl-16β-(δ-acetoxy-γ-methylpentanoyloxy)-4-pregnene-3,20-dione thus obtained there are added 190 parts of acetone, and heat is applied until complete solution results. A solution of 15 parts of sodium hydroxide in 240 parts of water is then added, and the mixture is maintained at 45–50° C. for 15 minutes. The reaction mixture is cooled to 0° C. and the resulting precipitate is collected on a filter and washed with a 13:7 mixture of acetone and water. A mixture of 28 parts of the crude product in 280 parts of acetone is stirred at 25° C. The chromium salts are removed by filtration through a bed of filter aid, and the filtrate is taken to dryness on a steambath. The residue is taken up in methanol, and chilled to yield crystals of 6α-methyl-4,16-pregnadiene-3,20-dione, melting at about 175–180° C. The rotation of a chloroform solution $\alpha_D$ is 152°.

Example 4

In a mixture of 2.3 parts of potassium hydroxide, 5 parts of water, and 320 parts of methanol, there are suspended 20 parts of 5α-hydroxy-6β-methyl-22-isoallospirostan-3-one, and the mixture is refluxed for 10 minutes. Then 500 parts of water are added and the mixture is cooled, and a solid material is collected on a filter and washed with water to neutrality to yield 6α-methyl-22-iso-4-spirosten-3-one which, recrystallized from methanol, melts at about 211–213° C. The rotation $\alpha_D$ in chloroform is —28°. The molecular absorption coefficient at 241 millimicrons is about 17,000.

A mixture of 40 parts of this compound with 98 parts of acetic anhydride is heated at 195° C. for 6 hours, and further treated as in the reaction sequence in the preceding example, to yield 6α-methyl-16-dehydroprogesterone in essentially the same yield. As a variation, 1,2-dichloroethane can be used in lieu of dichloromethane.

Example 5

On substitution of 60 parts of 6β-ethyl-22-isoallospirostane-3β,5α-diol as a starting material in Example 2, and use of procedures of Examples 2 and 3, there are obtained sequentially 6-ethyl-3,26-diacetoxy-3,5,20(22)-furostatriene, 6α-ethyl-26-hydroxy-4,20(22)-furostadien-3-one and its 26-acetate, 6α-methyl-16β-(δ-acetoxy-γ-methylpentanoyloxy)-4-pregnene-3,20-dione, and finally 6α-ethyl-4,16-pregnadiene-3,20-dione. An ultraviolet maximum is observed at 241 millimicrons with a molecular extinction of about 25,000.

Example 6

A solution of 10 parts of 6α-methyl-4,16-pregnadien-20-one in 360 parts of pure methanol is cooled to 8° C., and at that temperature treated by slow addition with 21.5 parts of a 35% aqueous hydrogen peroxide solution and 3.85 parts of a normal aqueous sodium hydroxide solution with continuous agitation. The reaction mixture is then maintained for 9 hours at about —2° C. after which 0.26 part of glacial acetic acid is added. The neutralized methanolic solution is filtered, and the filtrate is diluted with water to precipitate the 6α-methyl-16α,17α-epoxyprogesterone.

To 5 parts of this epoxide in 10 parts of glacial acetic acid is added a saturated solution of hydrogen bromide in 7 parts of glacial acetic acid, and the mixture is permitted to stand at room temperature for 30 minutes. The mixture is then poured into ice water, and the bromohydrin is extracted with ether. Upon evaporation of the ether, the dry bromohydrin is refluxed for 2 hours in methanolic solution with twice its weight of Raney nickel. The Raney nickel is removed by filtration, and the methanolic solution is evaporated almost to dryness. On recrystallization from aqueous acetone, the 6α-methyl-17α-hydroxy-4-pregnene-3,20-dione thus obtained melts at about 211–213° C. Acylation by conventional procedure of such 6α-alkyl-17α-hydroxy-4-pregnene-3,20-diones yields highly potent progestational agents.

What is claimed is:

1. 6α-(lower alkyl)-4,16-pregnadiene-3,20-dione wherein the lower alkyl group contains less than 3 carbon atoms.

2. 6α-methyl-4,16-pregnadiene-3,20-dione.

References Cited in the file of this patent

UNITED STATES PATENTS 2,702,297    Romo et al. _____ Feb. 15, 1955